UnitedStates Patent [19]

Bert et al.

[11] Patent Number: 4,910,174

[45] Date of Patent: Mar. 20, 1990

[54] THIN CERAMIC ARTICLES OBTAINED BY FUSING AND CASTING IN A MOLD A COMPOSITION OF THE SYSTEM $AL_2O$-$ZRO_2$-$SIO_2$-$K_2O$ WHICH HAVE GOOD MECHANICAL STRENGTH AND ABRASION RESISTANCE PROPERTIES

[75] Inventors: Christophe Bert, Sorgues; Daniel Urffer, Morieres les Avignon, both of France

[73] Assignee: Societe Europeenne des Produits Refractaires, France

[21] Appl. No.: 311,275

[22] Filed: Feb. 15, 1989

[30] Foreign Application Priority Data

Feb. 19, 1988 [FR] France ................... 88 01986

[51] Int. Cl.$^4$ .............................. C04B 35/48
[52] U.S. Cl. ..................... 501/105; 501/107
[58] Field of Search ................. 501/105, 107

[56] References Cited

U.S. PATENT DOCUMENTS

| | | | |
|---|---|---|---|
| 2,271,367 | 1/1942 | Fulcher et al. | 501/105 |
| 2,438,552 | 3/1948 | Field | 501/107 |
| 3,754,950 | 8/1973 | Cevalas | 501/105 |

FOREIGN PATENT DOCUMENTS 805205 12/1958 United Kingdom .

*Primary Examiner*—William R. Dixon, Jr.
*Assistant Examiner*—Miriam Sohn
*Attorney, Agent, or Firm*—Watson, Cole, Grindle & Watson

[57] ABSTRACT

The invention relates to ceramic articles.

It relates to an article made of ceramic material produced by fusing and casting in a mold a composition based on alumina, zirconia, silica and an alkali metal oxide, said article consisting of crystalline corundum and zirconia phases and of a vitreous phase, said zirconia being substantially in monoclinic form from the core to the skin of said article, and having, in at least one of its parts, a thickness lower than or equal to 30 mm and being intended for an application where mechanical strength and/or abrasion resistance are of primary importance, said composition consisting essentially, in % by weight based on the oxides, of:

| | |
|---|---|
| $Al_2O_3$ | 40–75 |
| $ZrO_2$ | 20–55 |
| $SiO_2$ | 5–20 |
| $Na_2O$ | 0–2.7 |
| $K_2O$ | 0.15–4.25 |
| $Fe_2O_3 + TiO_2 + CaO + MgO$ | 0–2, | with the condition that the weight ratio $$\frac{Na_2O + K_2O/1.52}{SiO_2}$$

is between 0.07 and 0.14 inclusive.

Application as micronizer disc, pump wear component and antiabrasion slab.

2 Claims, No Drawings

THIN CERAMIC ARTICLES OBTAINED BY FUSING AND CASTING IN A MOLD A COMPOSITION OF THE SYSTEM AL$_2$O-ZRO$_2$-SIO$_2$-K$_2$O WHICH HAVE GOOD MECHANICAL STRENGTH AND ABRASION RESISTANCE PROPERTIES

The invention relates to thin ceramic articles obtained by fusing and casting in a mold a composition of the system Al$_2$O—ZrO$_2$—SiO$_2$—K$_2$O which have good mechanical strength and abrasion resistance properties.

Refractory materials which are obtained by fusing and casting in a mold a composition based on alumina, zirconia and silica, called "AZS" for short, are well known and widely employed for the construction of glassmaking furnaces in the form of refractory blocks. US-A- 2,271,366, 2,438,552, 2,903,373 and FR-A- 1,153,488, among others, describe such materials. These patents refer to the presence, in addition to the main constituents which are alumina, zirconia and silica, of a small quantity of an alkali metal oxide which forms part of the composition of the vitreous phase binding the crystalline phases of the refractory material. Na$_2$O and K$_2$O and their mixtures are those most commonly mentioned as an alkali metal oxide and are described as being equivalent. In industrial practice, however, Na$_2$O is generally employed because of the lower cost and of the greater availability of sources of Na$_2$O (sodium carbonate being the usual source).

In addition to purely refractory applications, particularly in contact with molten glass, it has become apparent that fused cast products of the system Al$_2$O—ZrO$_2$—SiO$_2$—Na$_2$O exhibit properties which are advantageous in the case of antiabrasive applications at room or high temperatures.

In fact, the corundum-zirconia crystal lattice which may be associated in a eutectic is very hard and very tough. In addition, the bonding by a vitreous phase and the absence of open porosity, which characterize the fused cast oxides, endows these products with a remarkable cohesion which is very useful in antiabrasive applications.

It has also become apparent that the fused cast products of the system Al$_2$O—ZrO$_2$—SiO$_2$—Na$_2$O have an excellent resistance to corrosion by a wide range of attacking agents other than molten glass: dissolved or molten salts, acids or bases, even in concentrated solution, certain molten metals, etc.

On an industrial scale, in addition to large refractory blocks, the development of these new types of application has led to the production of thin slabs for antiabrasive and anticorrosion coatings as a replacement for metals (steels—cast irons) or for synthetic materials (plastics) or natural materials (dressed stone).

The progress in the field of melt-processing of oxides has made it possible to produce articles of more or less complex shape enabling the fitting to be simplified and the joints to be reduced to a minimum.

In certain applications the problems of abrasion are complicated by external mechanical stresses (impacts, vibrations). In other cases, the very function of the article involves these stresses (components rotating in an abrasive or corrosive medium). In certain new applications, structural components made of fused cast oxides are chosen for their chemical inertness, their low thermal conductivity or their light weight when compared with metals, and are subjected essentially to mechanical or thermomechanical stresses when applied.

It is easily appreciated that surface (or skin) faults, which are of minor importance in large refractory blocks which are subjected essentially to corrosion, acquire a crucial importance in thin articles, both because of geometrical considerations (relative magnitude of the fault in relation to thickness), and because of stress considerations in the application (risk of mechanical failure starting with these faults).

The mechanics of failure enable the strength of a material to be formulated as follows:

$$\sigma_R = \frac{K_c}{Y \sqrt{a_c}}$$

where
$\sigma_R$ = breaking stress (measured, for example by a flexural test)
$K_c$ = toughness at failure or critical stress intensity coefficient
$Y$ = geometric factor (depending on the specimen in question)
$a_c$ = equivalent length of the critical fault.

Mechanical strength is therefore:
proportional to the toughness at failure, which is an intrinsic characteristic of the material,
inversely proportional to the root of the size of the critical fault, which depends on the conditions of manufacture, possibly on the type of article, and the like.

The toughness of ceramics is lower than that of metals by an order of magnitude. This means that if the same mechanical strength is aimed at, the size of permissible faults in a ceramic will need to be two orders of magnitude below that of metals (for example, 10 μm, against 1 mm).

A fused cast ceramic of the AZS type is not exempt from this rule. It can be seen, therefore, that the reduction in fault size is of primary importance if attempts are made to produce articles which are to be mechanically stressed.

The strength of ceramics is much lower in tension than in compression; this characteristic renders thin ceramic articles highly sensitive to surface faults. The latter must therefore form the subject of special attention.

If the main faults of thin fused cast articles made of AZS are examined, they can be divided into two groups:
internal faults of the shrinkage porosity type,
internal faults of the skin fissure type.

According to the above observations, the critical faults should be the latter. This hypothesis is supported by the inspection of worn thin fused cast components, mechanically stressed in service, which shows that sudden or delayed failure is almost always initiated from skin fissures.

A route which is aimed at improving the mechanical strength of thin fused cast articles is therefore the reduction in skin fissuring.

Microscopic inspection of the skin fissuring in thin fused cast articles made of AZS shows that this fissuring is always located in the vitreous phase which binds the crystalline entanglement of the product.

When a product of this kind solidifies, the vitreous phase sets solid last. So long as it is plastic, the product can to a certain extent absorb stresses and distortions.

When it has solidified, the risks of fissuring are much greater.

It can therefore easily be seen that the nature of the vitreous phase plays an essential part in the fissuring of the fused cast products made of AZS.

This vitreous phase usually consists, on a weight basis, of approximately 70% of silica ($SiO_2$), approximately 25% of alumina ($Al_2O_3$), approximately 5% of sodium oxide ($Na_2O$), plus traces of other dissolved oxides ($ZrO_2$, $CaO$, $Fe_2O_3$, $TiO_2$).

In a product of this type, the term "traces" generally refers to quantities which are approximately smaller than 0.05% by weight.

The possibilities of modification of the vitreous phase with a view to improving skin fissuring by modifying the solidification conditions appear to be relatively limited.

Silica glass in equilibrium with corundum is saturated with alumina, and the only possible variable is the alkali metal oxide.

Decrease in the proportion of $Na_2O$ is rapidly reflected in the appearance of mullite, with a whole series of faults (fissuring, chipping etc.).

Increase in the proportion of $Na_2O$ appears to have a slightly favourable effect on the skin fissuring of thin components, but this is so to a quite limited degree (fissuring thereafter) and with an unfavourable effect on high temperature properties.

Complete or partial replacement of sodium oxide with other alkali metal oxides has been explored by the Applicant Company. In the Periodic Table of the elements, the alkali metals as far as the 6th period are the following, in order of increasing atomic weight:

lithium (Li), sodium (Na), potassium (K), rubidium (Rb), caesium (Cs).

Starting with the next period (francium), all the isotopes of the elements in question are radioactive, which presents an obvious problem.

Among the five alkali metals referred to above, some are available industrially in the form of carbonates without any major problem (Li, Na, K), while others are much more rare and expensive (Rb, Cs). For the sake of understanding, we have nevertheless included one of these (Cs) in the investigation carried out. The main characteristics of the four alkali metals investigated are collated in the following table:

|    | Atomic number | Mass number | 1st ionization energy (eV) | Ionic radius (Å) |
|----|---------------|-------------|----------------------------|------------------|
| Li | 3             | 6.94        | 5.4                        | 0.67             |
| Na | 11            | 22.99       | 5.1                        | 0.98             |
| K  | 19            | 39.10       | 4.3                        | 1.33             |
| Cs | 55            | 132.91      | 3.9                        | 1.69             |

These alkali metals may be advantageously introduced into the composition of oxides to be melted in the form of carbonates. This is the method we have chosen for our investigation. A release of $CO_2$ gas takes place during the melting and the alkali metal is recovered in oxide form in the vitreous phase of the solidified product ($Li_2O$, $Na_2O$, $K_2O$, $Cs_2O$).

The vitreous phase of the fused cast AZS products may be considered to be a silicate lattice consisting of more or less polymerized complex anions $SiO_4^{4-}$ and $AlO_4^{5-}$, as well as of simple $O^{2-}$ anions and of alkali metal cations $Na^+$ called lattice modifiers (or destroyers). Complete or partial replacement of the $Na^+$ ions with other alkali metals must be carried out with an identical number of moles of ions, to maintain the usual vitreous phase/corundum equilibrium with the absence of mullite. At an identical number of moles, the substitution of $K^+$ ions for the $Na^+$ ions produces a conversion ratio of $K_2O/Na_2O = 1.52$. According to this rule, 1% of $Na_2O$ on a mass basis must be replaced by 1.52% of $K_2O$ and, conversely, the molar equivalent of 1.52% of $K_2O$, on a mass basis, is 1% $Na_2O$. Furthermore, it is known that, in electrically fused cast products of the alumina-zirconiasilica type, the weight ratio $Na_2O/SiO_2$ must be kept between 0.07 and 0.14 in order to maintain a good equilibrium between the phases, with the absence of mullite in particular. This rule applies equally to the compositions containing $K_2O$ as a complete or partial replacement for $Na_2O$, considered in terms of $Na_2O$ equivalent according to the molar conversion $K_2O/Na_2O$ defined above. The condition which must be satisfied is therefore the following:

$$0.07 \leq \text{weight ratio } \frac{Na_2O + \frac{K_2O}{1.52}}{SiO_2} \leq 0.14$$

The attempts to produce thin fused cast AZS articles which we have carried out under these conditions have given widely different results, depending on the nature of the alkali metal oxide employed.

The AZS reference product, with $Na_2O$, systematically shows a fine skin fissuring. The fissures are typically 3 mm in depth in the case of components with a thickness of 10 mm.

The AZS product with $Li_2O$ exhibits a fissuring network which is more closely spaced than the reference product. On the other hand, the fissures appear to be less deep. On the whole, the average strength of thin articles is close to that of the reference product.

The AZS product with $Cs_2O$ exhibits surface fissures which are less numerous but severe. Here, too, the average mechanical strength of thin articles remains close to that of the reference product.

Surprisingly, we have found that the AZS composition with $K_2O$ results in thin fused cast articles which are almost free from skin fissures. The flexural mechanical strength of thin articles is considerably improved (from 50 to 140%) and various tests have made it possible to confirm that the skin quality is particularly healthy.

The present invention relates, therefore, to articles of ceramic material produced by fusing and casting in a mold a composition based on alumina, zirconia, silica and an alkali metal oxide, said article consisting of crystalline corundum and zirconia phases and of a vitreous phase, said zirconia being substantially in monoclinic form from the core to the skin of said article, and having in at least one of their parts a thickness lower than or equal to 30 mm and being intended for an application where mechanical strength and/or abrasion resistance are of primary importance, said composition consisting essentially in % by weight based on the oxides of:

| | |
|---|---|
| $Al_2O_3$ | 40–75 |
| $ZrO_2$ | 20–55 |
| $SiO_2$ | 5–20 |
| $Na_2O$ | 0–2.7 |
| $K_2O$ | 0.15–4.25 |

| | |
|---|---|
| -continued | |
| $Fe_2O_3 + TiO_2 + CaO + MgO$ | 0–2, | with the condition that (ii) the weight ratio $$\frac{Na_2O + K_2O/1.52}{SiO_2}$$

is between 0.07 and 0.14 inclusive.

The sum of $Fe_2O_3$, $TiO_2$, CaO and MgO must not exceed 0.3% by weight because the presence of a higher amount of these impurities deteriorates the properties of the article. Preferably, the proportion of $Na_2O$ is from 0 to 1.20% by weight and the proportion of $K_2O$ is from 0.25 to 2%, in order to obtain the best properties.

The articles of the invention are particularly useful in applications where mechanical strength and/or abrasion resistance are of primary importance. For example, they are employed as micronizer discs, wear components of pumps for liquids containing solids, antiabrasive coatings, and the like, without this list constituting a limitation.

If the potassium ion plays a favourable part during the solidification of the skin of AZS compositions, we have felt that this ought to be visible in characteristics other than skin fissuring.

We have therefore carried out detailed studies using x-ray diffraction to determine the crystallographic phases present from the core to the skin in the products solidified as thin articles.

In the case of the AZS reference product with $Na_2O$, the crystallographic phases at the core of an article 8 mm in thickness are corundum, monoclinic zirconia and the vitreous phase. The same result is found up to within approximately 1 mm of the skin. At this stage, and as far as the skin, tetragonal zirconia makes its appearance more markedly than monoclinic zirconia.

Crystallization of the same type is observed in fused cast Products in the form thin articles made of AZS with $Li_2O$ and AZS with $Cs_2O$; the AZS product with $K_2O$ forms an exception. In the AZS product with $K_2O$, in fact, corundum, monoclinic zirconia and the vitreous phase are found from the core as far as the skin of the product. The tetragonal zirconia line appears only very inconspicuously and, in all cases, homogeneously throughout the thickness of the article.

This individual crystallographic result appears to us to indicate a more "supple" behaviour in the skin of the AZS product with $K_2O$, which enables it to adapt to the spontaneous allotropic transition tetragonal zirconia $\rightarrow$ monoclinic zirconia on cooling, whilst the tetragonal phase is trapped by the sudden solidification and the rigidity of the vitreous phases of the other compositions.

If the vitreous phase with $K_2O$ adapts to the zirconia transition, it can also withstand the various solidification and cooling stresses without excessive rigidity and without fissuring.

Another point of view consists in considering that the tetragonal zirconia $\rightarrow$ monoclinic zirconia transition, with an increase in volume, gives rise to skin compression stresses which are favourable in minimizing the appearance of fissures.

This hypothesis of skin compression stresses is supported by thermal destressing treatment tests on thin articles. The flexural mechanical strength of the AZS reference product with $Na_2O$ is virtually unchanged after a prolonged period at 1,100° C. (a very slight increase). In contrast, the mechanical strength of the AZS product with $K_2O$ is deteriorated markedly after a heat treatment at 1,100° C. and becomes again like that of the usual product. This result could be explained by the presence of compression stresses in the skin of the AZS product with $K_2O$, stresses which improve its flexural strength but which disappear after heat treatment.

Another individual feature of the fused cast AZS product with $K_2O$ has been found in investigations of high-temperature transitions of the product. Small samples of AZS products with $Na_2O$ were heated to 1,600° C. for 7 hours and were then quenched in cold water. It was found that the behaviour of the vitreous phase of the two products is very different in a test of this type. In the case of the control product, the quantity of vitreous phase is increased by dissolution of alumina and zirconia and the analysis consequently changes. In the case of the product with $K_2O$ the quantity of vitreous phase and its analysis virtually do not change. This exceptional stability of the vitreous phase of the AZS product with $K_2O$ shows its individuality and no doubt plays an important part when the product solidifies.

The following examples, which do not imply any limitation, are given in order to better illustrate the invention. All the amounts and percentages are by weight.

EXAMPLE 1

A powder composition consisting of 49.9% of alumina (containing a little $Na_2O$), 47.6% of zircon sand and 2.5% of potassium carbonate is introduced into an Héroult type arc furnace for melting oxides. The preparation is carried out under oxidizing conditions (long arc), as described in FR-A-1,208,577. After melting, the cast product has the following analysis: 50.1% $Al_2O$, 32% $ZrO_2$, 16% $SiO_2$, 1.7% $K_2O$, 0.2% $Na_2O$, others <0.3% (within analytical accuracy).

The molten product is cast in the form of clusters of small slabs in sand moulds. Small slabs 120×120×8 mm in size allow the product to be properly characterized mechanically. 5 small bars 120×20×8 mm in size are cut from each small slab, each having 2 large raw casting faces.

By way of comparison, a reference AZS product with $Na_2O$ is cast under the said conditions. The powder composition charged into the furnace contains 50.7% of alumina, 47.6% of zircon sand and 1.7% of sodium carbonate. After melting, the cast product has the following analysis: 50.8% $Al_2O_3$, 32% $ZrO_2$, 16% $SiO_2$, 1 1 2% $Na_2O$; others <0.3%.

Comparison of the mechanical strength of 120×20×8 mm test specimens of the 2 products is first carried out according to a traditional method used by ceramists and specialists in refractories: 30 test specimens of each product are broken in 3-point flexure (80 mm interaxial distance) using a press fitted with instruments, which allows the fracture modulus to deduced therefrom. The results are expressed as a mean strength and standard deviation.

| | 3-Point flexural strength | Standard deviation |
|---|---|---|
| AZS — $Na_2O$ product | 50 MPa | 10 MPa |
| AZS — $K_2O$ product | 120 MPa | 15 MPa |

The superiority of the product according to the invention can be seen very clearly from the mean mechanical strength.

A more detailed mechanical approach can be made using 4-point flexure; the stressed volume in the test specimen is then, in fact, greater, and this increases the probability of finding a fault of large size.

It has been shown that the scatter of mechanical strengths of ceramics lends itself well to Weibull statistical analysis.

This analysis of the results leads to the determination of a parameter m (Weibull modulus), a characteristic of the scatter of the mechanical strength and hence of the size of critical faults (large m = low scatter).

This mechanical approach can be supplemented by measurements of the elasticity modulus. Two nondestructive dynamic methods of measuring this modulus were adopted: ultrasonics and the resonance frequency.

This more detailed method was applied to 30 120×120×8 mm test specimens of each of the products. 4-Point flexural strength was measured with interaxial distances of 50 and 100 mm and a load increase of 0.3 MPa/s.

The results obtained are collated in the table below:

|  | Elasticity modulus using ultrasonics | Elasticity modulus using resonance frequency | 4-point flexural strength modulus | Weibull modulus |
|---|---|---|---|---|
| AZS — Na$_2$O product | 139 GPa | 103 GPa | 37 MPa | 5.9 |
| AZS — K$_2$O product | 176 GPa | 163 GPa | 57 MPa | 7.7 |

The increase in the 4-point flexural mechanical strength of the product according to the invention in less pronounced than in 3-point flexure, but remains very clear. The Weibull statistical analysis confirms the lower scatter of the results.

The elasticity modulus is linked with faults in the test specimens in ceramics. Measurement using ultrasonics is more sensitive to core faults, while measurement using resonance frequency is more sensitive to skin faults, particularly to fissures. The results confirm the lower skin fissuring of the AZS product with K$_2$O.

EXAMPLE 2

In the preceding example we saw the major effect of K$_2$O when it replaces virtually all of the Na$_2$O. We have also found that favourable effect of the potassium ion is obtained even if the substitution is only partial.

We have cast products having compositions analyses as follows, under the same conditions as Example 1:

|  | Al$_2$O$_3$ | ZrO$_2$ | SiO$_2$ | Na$_2$O | K$_2$O |
|---|---|---|---|---|---|
| Composition 1 reference | 50.8% | 32% | 16% | 1.2% | 0% |
| Composition 2 | 50.6% | 32% | 16% | 1.15% | 0.25% |
| Composition 3 | 50.3% | 32% | 16% | 0.4% | 1.3% |
| Composition 4 | 50.2% | 32% | 16% | 0.3% | 1.5% |
| Composition 5 (of Example 1) | 50.1% | 32% | 16% | 0.2% | 1.7% |
| Composition 6 | 49.9% | 32% | 16% | 0.2% | 1.9% |

The mechanical strength has been measured in a simplified manner in 3-point flexure as indicated in Example 1.

The results are assembled in the following table:

|  | 3-Point flexural strength |
|---|---|
| Composition 1 | 50 MPa |
| Composition 2 | 80 MPa |
| Composition 3 | 95 MPa |
| Composition 4 | 105 MPa |
| Composition 5 | 120 MPa |
| Composition 6 | 120 MPa |

It can clearly be seen that, even when introduced in a very low proportion, the potassium ion has a favourable effect on fissuring and hence on the mechanical strength.

It can also be seen that, for a given composition, the optimized proportion of K$_2$O is situated when most sodium ions are replaced by the potassium ion (composition 5, for example). Beyond this (composition 6, for example) an excess of K$_2$O contributes nothing to mechanical strength in the cold.

EXAMPLE 3

The thin fused cast AZS articles are generally employed for antiabrasion applications.

It is of interest to see whether advantage is taken of the surface quality of the composition with K$_2$O strictly from the viewpoint of abrasion resistance, independently of the appearance and of mechanical strength.

We have employed the reference composition with Na$_2$O, referred to as "composition 1" in the preceding example, and the composition mentioned in Example 1 and referred to as "composition 5" in the preceding example, to cast slabs 120×120×15 mm and 250×250×25 mm in size.

These slab sizes are capable of being used in conventional antiabrasion applications (coating in circuits for conveying coal, for example).

Abrasion resistance is evaluated by means of a standardized test. Fused cast brown corundum (0.4–0.6mm) is sprayed at 60 m/s using an air pressure of 2.8 bars onto the product to be tested at an incidence angle of 45°. The resistance index is calculated from the loss in volume, compared with that of a standard on the basis of three sprayings of at least 1 kilogram of abrasive.

The results of abrasion on 120×120×15 mm slabs are as follows:

|  | Skin Resistance index | Resistance index at 5 mm from the skin |
|---|---|---|
| Composition 1 (AZS — Na$_2$O) | 121 | 82 |
| Composition 5 (AZS + K$_2$O) | 157 | 78 |

The results of the abrasion test on 250×250×25 mm slabs are as follows:

|  | Skin resistance index | Resistance index at 8 mm from the skin |
| --- | --- | --- |
| Composition 1 (AZS — Na₂O) | 126 | 81 |
| Composition 5 | 147 | 73 |

From these results it follows that the skin quality of the AZS-K₂O product has an appreciable effect on the abrasion resistance.

When compared with the reference product, the improvement appears to be proportionally more marked the thinner the article. However, the improvement is superficial, since it is absolutely imperceptible at ⅓ of the slab thickness.

EXAMPLE 4

One of the advantages of the AZS-Na₂O compositions is their suitability for moulding in the molten state, which makes it possible to obtain complex thin articles which are highly useful for the production of special assemblies for antiabrasion or other applications.

It is important to know whether the AZS-K₂O composition retains this advantage of processing into complex articles while retaining its specific advantages in respect of the skin quality.

We have adopted the reference composition given reference 1 in the preceding examples and the AZS-K₂O composition given reference 5.

We have melted these compositions in the usual Héroult furnace and cast the product in sand moulds to obtain special disc-shaped components intended for use in a wet mill employing micromedia. These discs are used for propelling the milling media in the composition to be milled or to be dispersed and are therefore stressed both from a mechanical point of view and from the point of view of abrasion resistance.

The discs which we have produced are components with an external diameter of 200 mm and 15 mm in thickness on average (nonuniform thickness: projections present) with a central hole for the hub and peripheral holes for the charge to pass through.

Comparison of the components obtained with compositions 1 and 5 shows very similar behaviour: same yield under identical conditions, same sensitivity to maladjustments (casting temperature, cooling conditions, etc). However, an improved surface appearance of the skin is systematically seen in the components obtained with composition 5 (AZS-K₂O).

This observation can be confirmed by means of a penetration control test which enables surface faults to be detected with a suitable liquid. A spider weblike fissuring is clearly seen with composition 1, whereas very few fissures are revealed with composition 5.

The resonance frequency is another means which can be employed as a nondestructive control test on a thin article. In the case of a complex component, such as the disc we have described, the elasticity modulus cannot deduced from the frequency measurement. However, with identical geometry, the raw resonance frequency result allows the components to be classified according to their fissuring. The 16 discs produced with composition 1 give a mean resonance frequency of 4,250 Hz, against 4,870 Hz in the case of the 16 discs produced with composition 5. Furthermore, when the 32 discs are classified in order of increasing frequency, 13 discs corresponding to the AZS-K₂O composition are found to be ahead.

The superiority of the discs cast with the composition according to the invention could also be demonstrated using the abrasion test described in Example 3. The skin abrasion resistance index of the AZS-K₂O discs has been found to be equal to 175, compared with 129 in the case of the AZS-Na₂O composition.

All these results clearly show the superiority of the composition according to the invention compared with the fused cast reference product in the form of thin articles, including complex components.

EXAMPLE 5

In all the preceding examples the melting of the composition and the production of the molten AZS bath in the electrical furnace have been carried out under the most oxidizing conditions recommended by FR-A-1,208,577 and its additions.

This modern arc fusion method is now in general use for this type of composition.

The compositions of the preceding examples have all been produced with relatively pure raw materials (metallurgical alumina, Australian zircon), making it possible to ensure that, in the finished product:

$$MgO + CaO + Fe_2O_3 < 0.2\%.$$

Here, too, this practice of limiting impurities corresponds to the modern method of manufacture of electrically melted refractories.

It seemed to us to be of interest, however, to verify the effect of the alkali metal oxide K₂O on an AZS product produced according to the old method (immersed graphite electrodes resulting in a product such as described by Sandmeyer in US-A-2,903,373, page 2, line 60) and with a composition containing the impurities of the first electrocast AZS products (MgO, CaO, Fe₂O₃).

We have therefore cast under these conditions a product having the following chemical analysis:

|  | Al₂O₃ | ZrO₂ | SiO₂ | Na₂O | K₂O | MgO | CaO | Fe₂O₃ |
| --- | --- | --- | --- | --- | --- | --- | --- | --- |
| Compo. 7 | 48.2% | 32% | 16% | 0.2% | 1.9% | 0.7% | 0.5% | 0.5% |

This composition differs from composition 6 of Example 2 only in the presence of the impurities (MgO, CaO, Fe₂O₃) and the reductive processing.

We have also compared composition 7 with a reduced product with impurities but containing the usual alkali metal oxide Na₂O (old fused cast AZS product):

|  | Al₂O | ZrO₂ | SiO₂ | Na₂O | K₂O | MgO | CaO | Fe₂O₃ |
| --- | --- | --- | --- | --- | --- | --- | --- | --- |
| Compo. 8 | 49.1% | 32% | 16% | 1.2% | 0% | 0.7% | 0.5% | 0.5% |

The three-point flexural mechanical strength on 120×20×8 mm test specimens produces the following result:

|  | 3-Point flexural strength |
| --- | --- |
| Compo. 6 (repeat) | 120 MPa |
| Compo. 7 | 90 MPa |

| | 3-Point flexural strength |
|---|---|
| Compo. 8 | 50 MPa |

This result clearly shows that the old AZS product (composition 8, reduced with impurities) is comparable to the present standard product (composition 1) with regard to the mechanical strength in the form of a thin article.

The use of the alkali metal oxide $K_2O$ with the same processing and the same impurities (composition 7) results in a significant improvement, which confirms the relatively unfissured appearance of the skin.

However, the reductive processing and the impurities do not make it possible to attain the surface quality of thin articles of the AZS product with $K_2O$ when processed under oxidizing conditions and without impurities (composition 6).

EXAMPLE 6

Example 1 is repeated, except that the small plaques obtained have the following composition by analysis (High zirconia content): 45.5% $Al_2O_3$ +41% $ZrO_2$+12.2% $SiO_2$+1.0% $Na_2O$ (others <0.3%) and on the same composition as above, but with introduction of 0.5% of $K_2O$. The appearance of the cast articles and their mechanical strength are much better in the case of the composition containing $K_2O$.

EXAMPLE 7

Example 1 is repeated, except that the small plaques obtained have the following composition by analysis (high corundum content): 72.5% $Al_2O_3$+21% $ZrO_2$+5.8% $SiO_2$+0.5% $Na_2O$ (others <0.2%) and on the same composition as above, but with addition of 0.5% of $K_2O$. The appearance of the cast articles and their mechanical strength are much better in the case of the composition containing $K_2O$.

We claim:

1. Article made of ceramic material produced by fusing and casting in a mold a composition based on alumina, zirconia, silica and an alkali metal oxide, said article consisting of crystalline corundum and zirconia phases and of a vitreous phase, said zirconia being substantially in monoclinic form from the core to the skin of said article, and having at least one part whose thickness is at most 30 mm, said composition consisting essentially, in % by weight based on the oxides, of:

| | |
|---|---|
| $Al_2O_3$ | 40–75 |
| $ZrO_2$ | 20–45 |
| $SiO_2$ | 5–20 |
| $Na_2O$ | 0–2.7 |
| $K_2O$ | 0.15–4.25 |
| $Fe_2O_3$ + $TiO_2$ + CaO + MgO | 0–0.3, | with the condition that the weight ratio $$\frac{Na_2O + K_2O/1.52}{SiO_2}$$

is between 0.07 and 0.14 inclusive.

2. Article according to claim 1, in which the proportion of $Na_2O$ is from 0 to 1.20 % by weight and the proportion of $K_2O$ is from 0.25 to 2% by weight.

* * * * *